United States Patent
Blumel et al.

(10) Patent No.: US 12,265,884 B2
(45) Date of Patent: Apr. 1, 2025

(54) FAST TWO-QUBIT GATES ON A TRAPPED-ION QUANTUM COMPUTER

(71) Applicant: IONQ, INC., College Park, MD (US)

(72) Inventors: Reinhold Blumel, Middletown, CT (US); Nikodem Grzesiak, College Park, MD (US); Ming Li, Silver Spring, MD (US); Andrii Maksymov, Hyattsville, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 878 days.

(21) Appl. No.: 17/464,595

(22) Filed: Sep. 1, 2021

(65) Prior Publication Data

US 2024/0296360 A1 Sep. 5, 2024

Related U.S. Application Data

(60) Provisional application No. 63/078,869, filed on Sep. 15, 2020.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ........ G06N 10/20; G06N 10/40; G06N 10/00; G06N 20/00; G06N 7/01; G05B 19/4155; G02F 3/00; G06F 11/076; H03K 19/195
See application file for complete search history.

(56) References Cited

U.S. PATENT DOCUMENTS

| | | | | |
|---|---|---|---|---|
| 9,413,470 B1* | 8/2016 | Smith | ..................... | H04B 10/70 |
| 10,483,980 B2* | 11/2019 | Sete | ..................... | H03K 19/195 |
| 10,956,267 B2* | 3/2021 | Kapit | .................. | G06F 11/076 |
| 11,210,602 B2* | 12/2021 | Biercuk | ................... | G06N 7/01 |
| 11,593,696 B2* | 2/2023 | Neill | ....................... | G06N 10/40 |
| 11,734,595 B2* | 8/2023 | Lucarelli | ............ | G05B 19/4155 706/62 |
| 11,875,222 B1* | 1/2024 | Reagor | .................. | G06N 20/00 |

(Continued)

FOREIGN PATENT DOCUMENTS

| | | | | |
|---|---|---|---|---|
| CA | 3088133 A1 * | 8/2019 | ............. | G06N 10/00 |
| KR | 2017034759 A * | 3/2017 | ............. | H04B 10/70 |

OTHER PUBLICATIONS

Martin, "Quantum feedback for measurement and control" 2019 https://escholarship.org/content/qt3n29j2k2/qt3n29j2k2_noSplash_e370ba6cbad6ac112f9e13897815fba3.pdf (Year: 2019).*

(Continued)

*Primary Examiner* — Steven P Sax
(74) *Attorney, Agent, or Firm* — Patterson + Sheridan, LLP

(57) ABSTRACT

A method for performing an entangling operation between trapped ions in a quantum computer includes selecting an amount of infidelity that is allowed in an entangling operation between two trapped ions in a quantum computer, computing a pulse function of a pulse to be applied to each of the two trapped ions based on gate operation conditions and the selected amount of infidelity, generating the pulse based on the computed pulse function, and applying the generated pulse to each of the two trapped ions to perform the entangling operation between the two trapped ions.

17 Claims, 6 Drawing Sheets

(56) References Cited

U.S. PATENT DOCUMENTS

| | | | | |
|---|---|---|---|---|
| 11,895,232 | B1* | 2/2024 | Stapleton | H04L 9/0852 |
| 11,995,512 | B2* | 5/2024 | King | G06N 10/60 |
| 12,028,448 | B2* | 7/2024 | Kaplan | H04L 9/0852 |
| 12,050,964 | B1* | 7/2024 | Niu | G06N 10/00 |
| 12,067,457 | B2* | 8/2024 | Smelyanskiy | G06N 10/00 |
| 12,086,431 | B1* | 9/2024 | Dreier | G06F 16/1827 |
| 12,126,713 | B1* | 10/2024 | Ramanathan | H04L 9/0861 |
| 2018/0046933 | A1* | 2/2018 | La Cour | G06F 12/023 |
| 2018/0114138 | A1 | 4/2018 | Monroe et al. | |
| 2020/0321949 | A1* | 10/2020 | Debnath | G06N 10/00 |
| 2020/0341084 | A1* | 10/2020 | Veglia | G06N 3/08 |
| 2020/0372391 | A1* | 11/2020 | Nam | B82Y 10/00 |
| 2021/0012233 | A1* | 1/2021 | Gambetta | G06F 8/44 |
| 2021/0116784 | A1* | 4/2021 | Sutherland | G02F 3/00 |
| 2022/0269974 | A1* | 8/2022 | Bhaskar | G02F 3/024 |
| 2022/0269976 | A1* | 8/2022 | Wang | G06N 10/00 |
| 2022/0329417 | A1* | 10/2022 | Farinholt | H04L 9/0858 |

OTHER PUBLICATIONS

Schmid, "Multi-photon entanglement and applications in quantum information" 2008 https://edoc.ub.uni-muenchen.de/8847/1/Schmid_Christian_IT.pdf (Year: 2008).*
Burrell, "High Fidelity Readout of Trapped Ion Qubits" 2010 https://www2.physics.ox.ac.uk/sites/default/files/Burrell_Thesis.pdf (Year: 2010).*
Japanese Patent Application No. 2023-515215, Office Action dated Jun. 12, 2024, 6 pages.
Figgatt C. et al. "Parallel Entangling Operations on a Universal Ion Trap Quantum Computer", arxiv.org, Cornell University Library, 201 Olin Library Cornell University Ithaca, NY 14853, Oct. 29, 2018, XP081992481.
International Search Report dated Dec. 23, 2021 for Application No. PCT/US2021/049933.
GOOGLE's Quantum Computer, described in: F. Arute et al., Quantum Supremacy Using a Programmable Superconducting Processor, Nature 574, 505-510 (2019).
IBM Quantum Experience: https://www.ibm.com/quantum-computing/ https://www.ibm.com/quantum-computing/ (Accessed Sep. 13, 2020).
Rigetti Computing: https://www.rigetti.comhttps://www.rigetti.com (Accessed Sep. 13, 2020).
Honeywell Quantum Solutions: https://www.honeywell.com/en-us/company/quantumhttps://www.honeywell.com/en-us/company/quantum (Accessed Sep. 13, 2020).
IonQ's Quantum Computer, described in: K. Wright et al., Benchmarking an 11-qubit Quantum Computer, Nature Communications 10, Article No. 5464 (2019).
Y. Nam et al., Ground-State Energy Estimation of the Water Molecule on a Trapped-Ion Quantum Computer, npj Quantum Information 6, Article No. 33 (2020).
Qiskit, https://github.com/Qiskit/ibmq-device-information (Accessed Sep. 12, 2020).

The Quil Compiler, https://pyquil-docs.rigetti.com/en/stable/compiler.html#compiler (Accessed Sep. 12, 2020).
D. Maslov, Basic circuit compilation techniques for an ion-trap quantum machine, New J. Phys. 19, 023035 (2017).
C. D. Bruzewicz, J. Chiaverini, R. McConnell, and J. M. Sage, Trapped-Ion Quantum Computing: Progress and Challenges, Appl. Phys. Rev. 6, 021314 (2019).
Amazon Braket Hardware Providers / Rigetti: https://aws.amazon.com/braket/hardware-providers/rigetti/ (Accessed Sep. 12, 2020).
A. Albrecht, A. Retzker, F. Jelezko, M. Plenio, Coupling of nitrogen vacancy centres in nanodiamonds by means of phonons, New J. Phys. 15, 083014 (2013).
J. Majer, J. M. Chow, J. M. Gambetta, Jens Koch, B. R. Johnson, J. A. Schreier, L. Frunzio, D. I. Schuster, A. A. Houck, A. Wallraff, A. Blais, M. H. Devoret, S. M. Girvin, and R. J. Schoelkopf, Coupling superconducting qubits via a cavity bus, Nature 449, 443â€"447 (2007).
S.-L. Zhu, C. Monroe, L.-M. Duan, Arbitrary-speed quantum gates within large ion crystals through minimum control of laser beams. Europhys. Lett. 73, 485 (2006).
T. Choi, S. Debnath, T. A. Manning, C. Figgatt, Z.-X. Gong, L.-M. Duan, and C. Monroe, Optimal Quantum Control of Multimode Couplings between Trapped Ion Qubits for Scalable Entanglement, Phys. Rev. Lett. 112, 190502 (2014).
P. H. Leung, K. A. Landsman, C. Figgatt, N. M. Linke, C. Monroe, K. R. Brown, Robust 2-qubit gates in a linear ion crystal using a frequency-modulated driving force, Phys. Rev. Lett. 120, 020501 (2018).
T. J. Green, M. J. Biercuk, Phase-modulated decoupling and error suppression in qubit-oscillator systems, Phys. Rev. ett. 114, 120502 (2015).
R. Blumel, N. Grzesiak, and Y. Nam, Power-optimal, stabilized entangling gate between trapped-ion qubits, https://arxiv.org/abs/1905.09292https://arxiv.org/abs/1905.09292 (2019).
K. Mølmer, A. Sørensen, Multiparticle Entanglement of Hot Trapped Ions, Phys. Rev. Lett. 82, 1835-1838 (1999).
N. C. Brown and K. R. Brown, Comparing Zeeman qubits to hyperfine qubits in the context of the surface code: 174Yb + and 171Yb+ Phys. Rev. A 97, 052301 (2018).
N. M. Linke, D. Maslov, M. Roetteler, S. Debnath, C. Figgatt, K. A. Landsman, K. Wright, C. Monroe, Experimental comparison of two quantum computing architectures, Proc. Natl. Acad. Sci. U.S.A. 114, 3305-3310 (2017).
A. Teman, D. Rossi, P. A. Meinerzhagen, L. Benini, and A. P. Burg, Power, Area, and Performance Optimization of Standard Cell Memory Arrays Through Controlled Placement, ACM Transactions on Design Automation of Electronic Systems, vol. 21, No. 4 May 2016, Article No. 59, https://doi.org/10.1145/2890498.
D. J. Wineland, C. Monroe, W. M. Itano, D. Leibfried, B. E. King, D. M. Meekhof, Experimental Issues in Coherent Quantum-State Manipulation of Trapped Atomic Ions, J. Res. Natl. Inst. Stand. Technol. 103, 259-328 (1998).
Y. Wu, S.-T. Wang, and L.-M. Duan, Noise analysis for high-fidelity quantum entangling gates in an anharmonic linear Paul trap, Phys. Rev. A 97, 062325 (2018).

* cited by examiner

FAST TWO-QUBIT GATES ON A TRAPPED-ION QUANTUM COMPUTER

CROSS-REFERENCE TO RELATED APPLICATIONS

This application claims priority to U.S. Provisional Patent Application Ser. No. 63/078,869, filed on Sep. 15, 2020, which is incorporated by reference herein.

BACKGROUND

Field

The present disclosure generally relates to a method of generating an entangling gate in an ion trap quantum computer, and more specifically, to a method to inject a small amount of infidelity to reduce the power requirements for a two-qubit gate pulse.

Description of the Related Art

A handful of universally programmable, commercial quantum computers are available today and the race to quantum readiness for the emerging era of practical quantum computing has begun. Ranging from code breaking to quantum chemistry simulations the application space of quantum computers continues to grow. When programming these quantum applications, the computational instructions are typically compiled to single- and two-qubit quantum gates. In the leading quantum hardware platforms such as ion-trap or superconducting architectures, these basis types of quantum gates are well known. At the physical, hardware execution level, two-qubit gates are comparatively more challenging to implement than single-qubit gates. Roughly speaking, in terms of fidelity and gate duration, single-qubit gates are about one or two orders of magnitude less demanding to implement than two-qubit gates. Fidelities of 99.97% and 99.3% for single- and two-qubit gates, respectively, have been reported.

For instance, on a contemporary trapped-ion quantum computer with laser-based gates, single-qubit gates have been reported to achieve fidelity of 99.993%. This may be compared with two-qubit gates implemented according to the Mølmer-Sørensen (MS) method, which have been reported to achieve fidelities of 99.9%. To thus catapult the utility of quantum computers, improving two-qubit gate performance becomes a critical task. To this end, multiple pulse shaping methods have been devised with various features such as better robustness against experimental parameter drift or pulse shaping methods that have lower power requirements. For the Mølmer-Sørensen (MS) method on a trapped-ion quantum computer, a constructive method to obtain the power-optimal pulse shape and a systematic way to stabilize it against experimental parameter drifts to an arbitrary degree have been reported. In addition, the results reported also include a hard, mathematically exact lower bound on the power requirement for an exact implementation of an MS gate.

However, an implementation of a quantum gate is expected to be imperfect in practice, and thus mathematical exactness in the quantum gate construction method is not reflected in practically implemented quantum gates. Therefore, there is a need for a procedure for quantum gate construction having relaxed mathematical exactness, to provide computationally less demanding pulse shaping that achieves a reduced power requirement.

SUMMARY

Embodiments of the disclosure include a method for performing an entangling operation between trapped ions in a quantum computer. The method includes selecting an amount of infidelity that is allowed in an entangling operation between two trapped ions in a quantum computer, computing a pulse function of a pulse to be applied to each of the two trapped ions based on gate operation conditions and the selected amount of infidelity, generating the pulse based on the computed pulse function, and applying the generated pulse to each of the two trapped ions to perform the entangling operation between the two trapped ions.

Embodiments of the disclosure also include an ion trap quantum computing system. The ion trap quantum computing system includes a quantum processor comprising a plurality of qubits, each qubit comprising a trapped ion having two hyperfine states, one or more lasers configured to emit a laser beam, which is provided to trapped ions in the quantum processor, a classical computer, and a system controller. The classical computer is configured to perform operations including selecting an amount of infidelity that is allowed in an entangling operation between two trapped ions in a quantum computer, computing a pulse function of a pulse to be applied to each of the two trapped ions based on gate operation conditions and the selected amount of infidelity, and generating the pulse based on the computed pulse function. The system controller is configured to execute a control program to control the one or more lasers to perform operations on the quantum processor, the operations including applying the generated pulse to each of the two trapped ions to perform the entangling operation between the two trapped ions, and measuring population of qubit states in the quantum processor. The classical computer is further configured to output the measured population of qubit states in the quantum processor.

Embodiments of the disclosure further provide an ion trap quantum computing system. The ion trap quantum computing system includes a classical computer, a quantum processor comprising a plurality of qubits, each qubit comprising a trapped ion having two hyperfine states, a system controller configured to execute a control program to control the one or more lasers to perform operations on the quantum processor, and non-volatile memory having a number of instructions stored therein. The instructions, when executed by one or more processors, cause the ion trap quantum computing system to perform operations including selecting, by the classical computer, an amount of infidelity that is allowed in an entangling operation between two trapped ions in a quantum computer, computing, by the classical computer, a pulse function of a pulse to be applied to each of the two trapped ions based on gate operation conditions and the selected amount of infidelity, generating, by the classical computer, the pulse based on the computed pulse function, applying, by the system controller, the generated pulse to each of the two trapped ions to perform the entangling operation between the two trapped ions, measuring, by the system controller, population of qubit states in the quantum processor, and outputting, by the classical computer, the measured population of qubit states in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
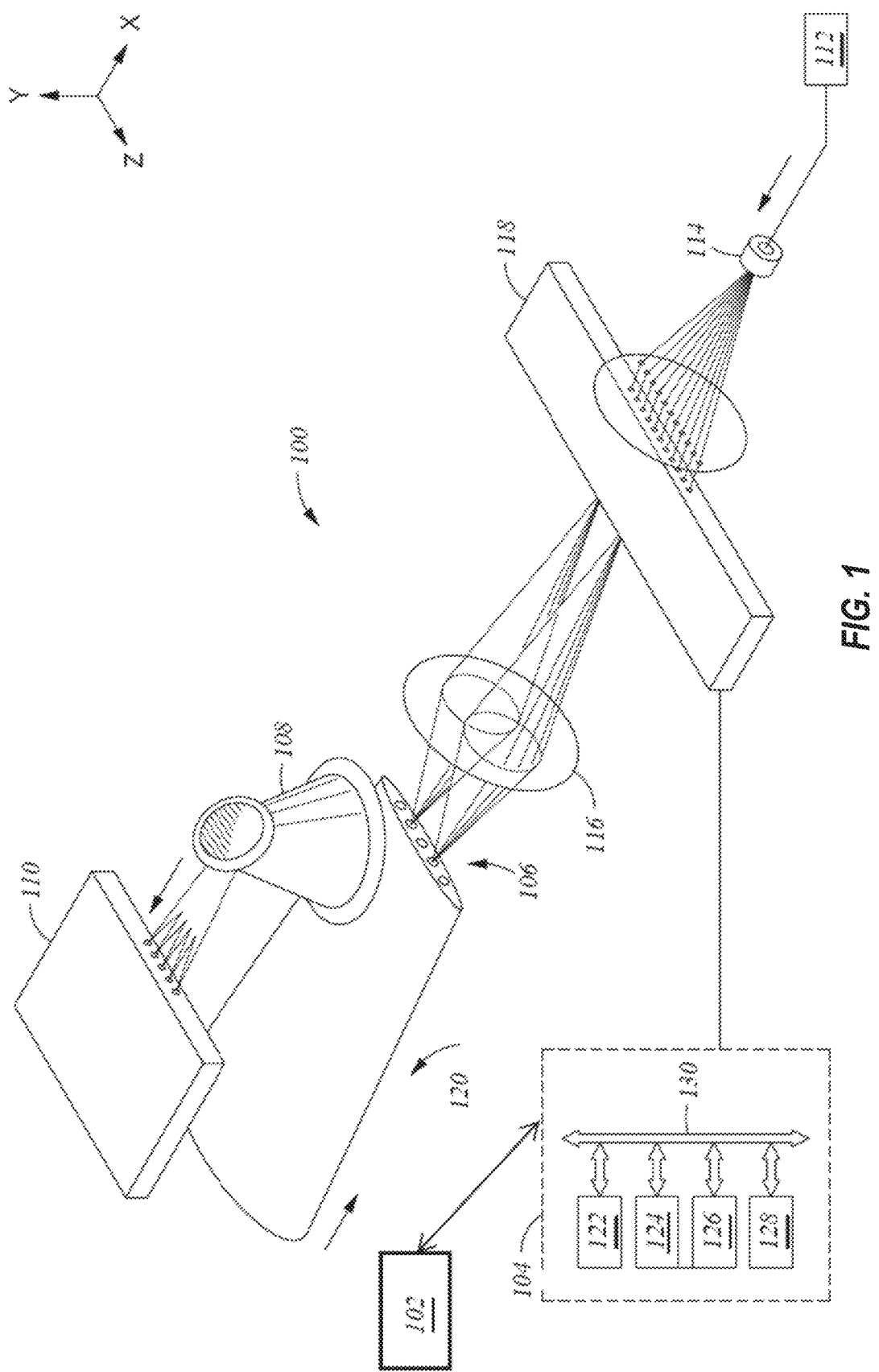
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a pulse shaping technique that includes a systematic method of removing the mathematical exactness requirement when defining ion interacting pulse(s) during a quantum computing computational process so that a savings in the required pulse-power can be achieved. In some embodiments, the pulse-power savings can be more than an order of magnitude under realistic trapped-ion quantum computer operating conditions. By trading the power savings for gate duration, the two-qubit gates can be sped up by an order of magnitude for a given power budget. This trade-off comes with an additional benefit, i.e., a natural robustness of the gate with respect to experimental parameter drift.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

General Hardware Configurations

FIG. 1 is a schematic partial view of an ion trap quantum computing system 100, or simply the system 100, according to one embodiment. The system 100 can be representative of a hybrid quantum-classical computing system. The system 100 includes a classical (digital) computer 102 and a system controller 104. Other components of the system 100 shown in FIG. 1 are associated with a quantum processor, including a chain 106 of trapped ions (i.e., five shown as circles about equally spaced from each other) that extend along the Z-axis. Each ion in the chain 106 of trapped ions is an ion having a nuclear spin I and an electron spin s such that a difference between the nuclear spin I and the electron spin s is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the chain 106 of trapped ions are the same species and isotope (e.g., $^{171}Yb^+$). In some other embodiments, the chain 106 of trapped ions includes one or more species or isotopes (e.g., some ions are $^{171}Yb^+$ and some other ions are $^{133}Ba^+$). In yet additional embodiments, the chain 106 of trapped ions may include various isotopes of the same species (e.g., different isotopes of Yb, different isotopes of Ba). The ions in the chain 106 of trapped ions are individually addressed with separate laser beams. The classical computer 102 includes a central processing unit (CPU), memory, and support circuits (or I/O) (not shown). The memory is connected to the CPU, and may be one or more of a readily available memory, such as a read-only memory (ROM), a random-access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 (or some other imaging device) for measurement of individual ions. Raman laser beams from a laser 112, which are provided along the X-axis, perform operations on the ions. A diffractive beam splitter 114 creates an array of Raman laser beams 116 that are individually switched using a multi-channel acousto-optic modulator (AOM) 118. The AOM 118 is configured to selectively act on individual ions by individually controlling emission of the Raman laser beams 116. A global Raman laser beam 120, which is non-copropagating to the Raman laser beams 116, illuminates all ions at once from a different direction. In some embodiments, rather than a single global Raman laser beam 120, individual Raman laser beams (not shown) can be used to each illuminate individual ions. The system controller (also referred to as a "RF controller") 104 controls the AOM 118 and thus controls intensities, timings, and phases of laser pulses to be applied to trapped ions in the chain 106 of trapped ions. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by the CPU 122 in order to perform various functionalities associated with receiving and analyzing data and controlling any and all aspects of the methods and hardware used to implement and operate the ion trap quantum computing system 100 discussed herein.

Figure 2:
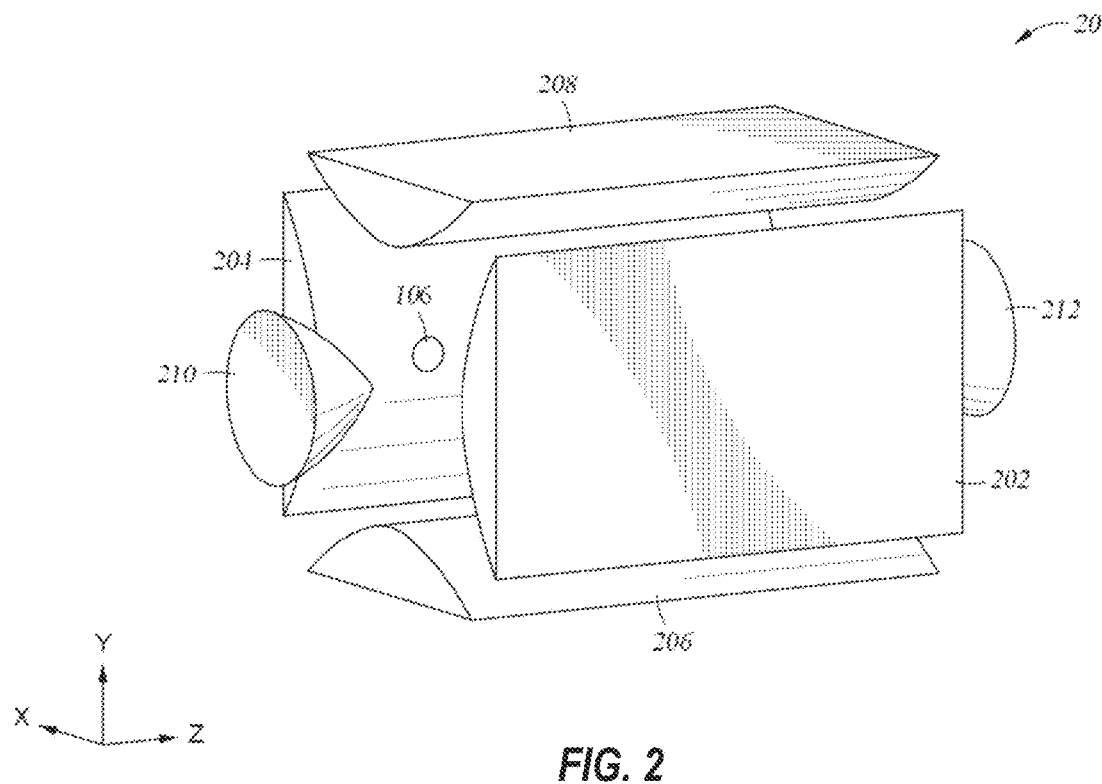
FIG. 2 depicts a schematic view of an ion trap for confining ions in a group according to one embodiment.

FIG. 2 depicts a schematic view of an ion trap 200 (also referred to as a Paul trap) for confining ions in the chain 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the chain 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to the distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Although not shown, a different type of trap is a micro-fabricated trap chip in which a similar approach as the one described above is used to hold or confine ions or atoms in place above a surface of the micro-fabricated trap chip. Laser beams, such as the Raman laser beams described above, can be applied to the ions or atoms as they sit just above the surface.

Figure 3:
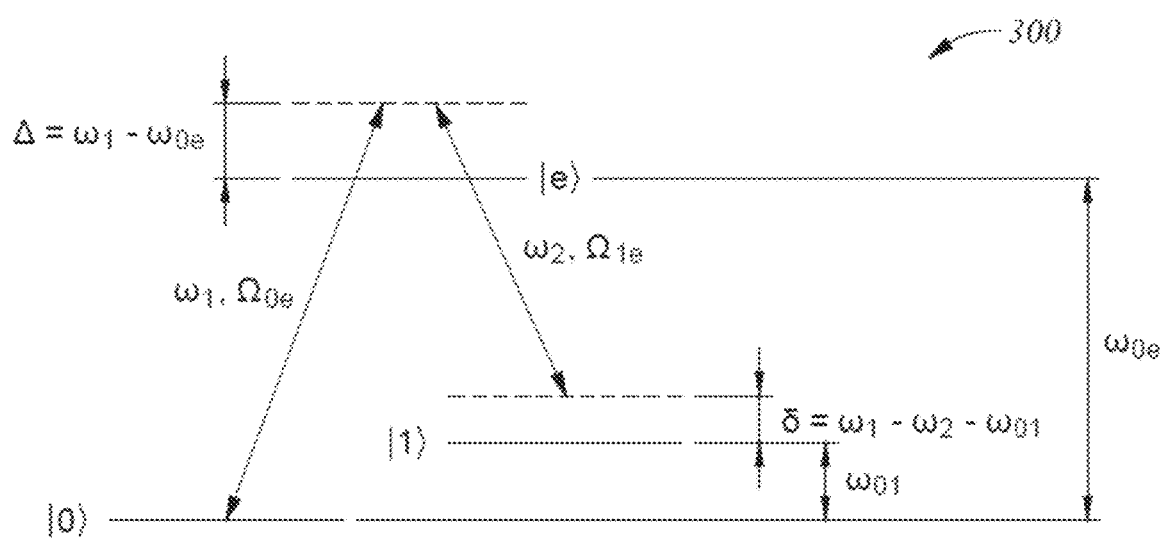
FIG. 3 depicts a schematic energy diagram of each ion in a group of trapped ions according to one embodiment.

FIG. 3 depicts a schematic energy diagram 300 of each ion in the chain 106 of trapped ions according to one embodiment. Each ion in the chain 106 of trapped ions is an ion having a nuclear spin I and an electron spin s such that a difference between the nuclear spin I and the electron spin s is zero. In one example, each ion may be a positive Ytterbium ion, $^{171}Yb^+$, which has a nuclear spin I=½ and the $^2S_{1/2}$ hyperfine states with an energy split corresponding to a frequency difference (referred to as a "carrier frequency") of $\omega_{01}/2\pi$=12.642812 GHz. In other examples, each ion may be a positive barium ion $^{133}Ba^+$, a positive cadmium ion $^{111}Cd^+$ or $^{113}Cd^+$, which all have a nuclear spin I=½ and the $^2S_{1/2}$ hyperfine states. A qubit is formed with the two hyperfine states, denoted as |0> and |1>, where the hyperfine ground state (i.e., the lower energy state of the $^2S_{1/2}$ hyperfine states) is chosen to represent |0>. Hereinafter, the terms "hyperfine states," "internal hyperfine states," and "qubits" may be interchangeably used to represent |0> and |1>. Each ion may be cooled (i.e., kinetic energy of the ion may be reduced) to near the motional ground state for any motional mode with no phonon excitation by known laser cooling methods, such as Doppler cooling or resolved sideband cooling, and then the qubit state prepared in the hyperfine ground state |0> by optical pumping.

An individual qubit state of each trapped ion may be manipulated by, for example, a mode-locked laser at 355 nanometers (nm) via the excited $^2P_{1/2}$ level (denoted as |e>). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between |0> and |e>, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states |0> and |1>. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states |0> and |e> and between states |1> and |e> respectively occur, and a spontaneous emission rate from the excited state |e>, Rabi flopping between the two hyperfine states |0> and |1> (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Entangling Gate Operations

In an ion trap quantum computer, the motional modes of a chain 106 of trapped ions, which arise from their Coulombic interaction between the ions may act as a data bus to mediate entanglement between two-qubit ions (i-th ion and j-th ion) in a chain 106 of trapped ions and this entanglement is used to perform an XX gate operation between the two ions. That is, each of the two ions is entangled with the motional modes, and then the entanglement is transferred to an entanglement between the two ions by using motional sideband excitations as known in the art. Specifically, a combined state of two ions (i-th and j-th ions) is transformed by applying a laser pulse consisting of composite pulses on the motional sidebands to the two ions for a gate duration t, where the laser pulse is shaped over the gate duration τ such that the transformation of the combined state follows an intended XX gate operation (referred to as a "gate angle condition"), while states of remaining trapped ions in the chain 106 remain unchanged at the end of the gate duration τ (referred to as a "phase-space condition"). The gate angle condition and the phase-space condition together are referred to as "gate operation conditions" hereinafter. Techniques for shaping such a laser pulse are typically based on amplitude modulation, frequency modulation, or phase modulation of a laser pulse over the gate duration τ. Among those techniques, there has been proposed an exact and computationally efficient pulse shaping technique, referred to as an exact amplitude-and-frequency modulated (E-AMFM) method herein, that provides a laser pulse shaping to execute an exact XX gate operation with 100% fidelity (i.e., the gate operation conditions are exactly fulfilled). The E-AMFM method can further provide features, such as active stabilization of fidelity of the XX gate operation up to a desired degree K with respect to motional mode frequency drift $\Delta\omega_p$ (referred to as a "stabilization conditions" hereinafter), and power optimization of laser pulses (referred to as a "power optimization condition). It should be noted that the number of gate operation conditions increases as the number of ions in the chain 106 of trapped ions, and/or the number of active stabilization conditions, equal to the degree K of the active stabilization, increases. Thus, for a long chain 106 of trapped ions (i.e., the number of ions in the chain 106 is large) and/or for a higher degree K of active stabilization, a laser pulse must be shaped such that more conditions must be fulfilled to execute an exact XX gate operation, reducing degrees of freedom (i.e., possible values of amplitudes and phases) in selecting a power-optimal pulse shaping. In the example described below, the same laser pulse is applied to both the i-th and the j-th ions. However, in some embodiments, different laser pulses are applied to the i-th and the j-th ions.

In the following, the pulse-shaping method is described in more detail. First, the amplitude modulation and the detuning modulation of the laser pulse are referred to as an amplitude function $\Omega(t)$ and a detuning frequency function $\mu(t)$, respectively. Furthermore, a pulse function g(t) of the laser pulse defined as $$g(t) = \Omega(t)\sin\left[\int_0^t \mu(t)dt\right]$$

is used and may be decomposed using basis functions $Q_n(t)(n=1, 2, \ldots, N_B)$ as $$g(t) = \sum_{n=1}^{N_B} A_n Q_n(t),$$

where $A_n$ are control parameters associated with the basis functions $Q_n(t)(n=1, 2, \ldots, N_B)$. In the example described below, sine functions $$\sin\left(\frac{2\pi n}{\tau}t\right)$$

are used as the basis functions $Q_n(t)$. However, the basis functions $Q_n(t)$ can be any functions that are orthogonal to one another. The number $N_B$ of basis functions $Q_n(t)$ is a sufficiently large number chosen to achieve convergence.

The transformation of the combined state of two qubits (i-th and j-th qubits) by the application of the laser pulse can be described in terms of an entangling interaction $\chi_{ij}$ as follows:

$$|0\rangle_i|0\rangle_j \to \cos(2\chi_{ij})|0\rangle_i|0\rangle_j - i\sin(2\chi_{ij})|1\rangle_i|1\rangle_j$$
$$|0\rangle_i|1\rangle_j \to \cos(2\chi_{ij})|0\rangle_i|1\rangle_j - i\sin(2\chi_{ij})|1\rangle_i|0\rangle_j$$
$$|1\rangle_i|0\rangle_j \to i\sin(2\chi_{ij})|0\rangle_i|1\rangle_j + \cos(2\chi_{ij})|1\rangle_i|0\rangle_j$$
$$|1\rangle_i|1\rangle_j \to -i\sin(2\chi_{ij})|0\rangle_i|0\rangle_j + \cos(2\chi_{ij})|1\rangle_i|1\rangle_j$$

where the entangling interaction $\chi_{ij}$ can be written in terms of the pulse function g(t) as, $$\chi_{ij} = \sum_{p=1}^{P} \eta_p^i \eta_p^j \int_0^\tau dt_2 \int_0^{t_2} dt_1 g(t_2)g(t_1)\sin[\omega_p(t_2-t_1)].$$

$\eta_p^i$ is the Lamb-Dicke parameter that quantifies the coupling strength between the i-th ion and the p-th motional mode having the frequency $\omega_p$. A maximally entangling gate that corresponds to a transformation of the combined state of two qubits $$|0\rangle_i|0\rangle_j \to |0\rangle_i|0\rangle_j - i|1\rangle_i|1\rangle_j$$
$$|0\rangle_i|1\rangle_j \to |0\rangle_i|1\rangle_j - i|1\rangle_i|0\rangle_j$$
$$|1\rangle_i|0\rangle_j \to -i|0\rangle_i|1\rangle_j + i|1\rangle_i|0\rangle_j$$
$$|1\rangle_i|1\rangle_j \to -i|0\rangle_i|0\rangle_j + i|1\rangle_i|1\rangle_j$$

is achieved when $$\chi_{ij} = \frac{\pi}{8}$$

is satisfied.

The phase-space condition described above requires that the trapped ions in the chain 106 that are displaced from their initial positions as the motional modes are excited by the delivery of the laser pulse return to their initial positions. A l-th trapped ion in the chain 106 in a superposition state |0>±|1> is displaced due to the excitation of the p-th motional mode during the gate duration τ and follows the trajectories $\pm\alpha_p^l(t')$ in phase space (position and momentum) of the p-th motional mode. The phase-space trajectories $$\alpha_p^l(t') = -\eta_p^l \int_0^{t'} g(t) e^{i\omega_p t} dt$$

are determined by the amplitude function Ω(t) and the detuning function μ(t) of the laser pulse applied to the l-th trapped ion. Thus, for the chain 106 of N trapped ions, the condition $\alpha_p^l(\tau)=0$ (i.e., the trajectories $\alpha_p^l(t)$, l=i, j are closed) must be imposed for all the P motional modes (p=1, 2, . . . , P, P=N).

The stabilization conditions of order K with respect to motional-mode frequency drift $\Delta\omega_p$ can be described as $$\left(\frac{\partial^k}{\partial \omega_p^k}\right)\alpha_p^l(\tau) = -\left(\frac{\partial^k}{\partial \omega_p^k}\right)\eta_p^l \int_0^\tau g(t) e^{i\omega_p t} dt = 0$$

$$(l = i, j, p = 1, 2, \dots, P, k = 1, 2, \dots, K).$$

Alternatively, the phase-space condition and the stabilization conditions of order K can be written together as $$\left(\frac{\partial^k}{\partial \omega_p^k}\right)\alpha_p^l(\tau) = -\left(\frac{\partial^k}{\partial \omega_p^k}\right)\eta_p^l \int_0^\tau g(t) e^{i\omega_p t} dt = 0.$$

$$(l = i, j, p = 1, 2, \dots, P, k = 0, 1, 2, \dots, K).$$

These conditions can be written in matrix form as $$\sum_{n=1}^{N_B} M_{mn}^{pk} A_n = M\vec{A} = 0 \; (m = 1, \dots, N_B, p = 1, 2, \dots, P, k = 0, \dots, K),$$

where $M_{mn}^{pk}$ is defined as $$M_{mn}^{pk} = -\left(\frac{\partial^k}{\partial \omega_p^k}\right)$$

$$\int_0^\tau \sin\left(\frac{2\pi n}{\tau} t\right) e^{i\omega_p t} dt (k = 0, \dots, K, p = 1, 2, \dots, P, m, n = 1, 2, \dots, N_B),$$

assuming that the same pulse is applied to the i-th and j-th ions. A similar matrix form obtains if different pulses are applied to the i-th and j-th ions.

The gate angle condition requires that the entangling interaction $\chi_{ij}$ generated between the i-th and j-th ions by the laser pulse has a desired value $\theta_{ij}$. The XX-gate operation with maximal entanglement can be executed with $|\theta_{ij}|=\pi/8$.

When implemented in a practical trapped-ion quantum computing system, which includes speed-and-bandwidth limited hardware that may cause intrinsic errors in gate operations, even a laser pulse shaped by the E-AMFM method cannot execute an exact XX gate operation with 100% fidelity. Thus, a laser pulse that is shaped to execute an XX gate operation that allows a slight infidelity has a negligible effect on the fidelity of an XX gate that is practically implemented. Thus, in the embodiments described herein, a pulse shaping technique, referred to as an inexact amplitude-and-frequency modulated (I-AMFM) method (also referred to as a "fast-gate method" hereinafter) provides a laser pulse shaping method to execute a XX gate operation with fidelity slightly less than 100%, as discussed below. The I-AMFM fast-gate method is also computationally efficient as is the case for the E-AMFM method, and provides the same additional features, such as, active stabilization of fidelity of the XX gate operation up to a desired degree K with respect to motional-mode frequency drift $\Delta\omega_p$, and optimizing the power requirement of laser pulses.

Fast-Gate Method

In a practical quantum computing system, a small amount of infidelity in an XX gate operation is inevitable. Therefore, a laser pulse shaped to execute an XX gate operation with fidelity of slightly less than 100% does not result in a noticeable deterioration in an XX gate operation that is practically implemented, while relaxing the gate operation conditions may result in substantial reduction in the power requirement of the laser pulse. Accordingly, in the fast-gate method described herein, infidelity f of a negligible amount, for example, an amount of infidelity comparable to or less than intrinsic imperfections in a practical quantum computing system, is introduced in shaping a laser pulse to be applied to two ions to execute an XX gate operation. This introduction of infidelity f corresponds to relaxing the gate operation conditions. Even though only a negligible amount of infidelity is introduced in laser pulse shaping, the power requirement is reduced significantly. The power saved by the lowered power requirement for execution of an XX gate can be traded off for execution of an XX gate with a shorter gate duration τ (i.e., an XX gate can be performed faster). The power saved by the lowered power requirement for execution of an XX gate can alternatively or additionally be traded off for other desirable features, such as better qubit connectivity (i.e., an XX gate can be implemented in a long chain of trapped ions) or robustness.

In one embodiment of the fast-gate method (referred to as a "F-matrix protocol" hereinafter), infidelity f of an XX gate operation executed by a pulse having the pulse function g(t) can be written as $$f = \left(\frac{4}{5}\right) \vec{A}^T F \vec{A},$$

in matrix form, where $\vec{A}$ is a $N_B$ control parameter vector of $A_n$ (taken from the space of vectors that satisfy the stabilization conditions), and F is a $N_B \times N_B$ coefficient matrix of $F_{nm}$ defined as $$F_{nm} = \sum_{p=1}^N [(\eta_p^i)^2 + (\eta_p^j)^2] C_{np}^* C_{mp}$$

in terms of the coefficients $C_{np}$ $$C_{np} = \int_0^\tau Q_n(t)e^{i\omega_p t}dt.$$

Since the matrix F may be spectrally decomposed, the infidelity f may be systematically controlled by selecting the control parameters $A_n$ as a linear superposition of the set of $L_{cut}$ eigenvectors $\vec{V}_l$ (l=1, 2, ..., $L_{cut}$) of the matrix F that correspond to eigenvalues $\varphi_l$(l=1, 2, ..., $L_{cut}$) of the matrix F having the $L_{cut}$ smallest absolute values with expansion coefficients $B_l$, where $L_{cut} < N_B$.

The expansion coefficients $B_l$ are determined by requiring the gate angle condition $$\chi(\tau) = \vec{A}^{*T}W\vec{A} = \vec{B}^{*T}S\vec{B} = \frac{\pi}{8}, \quad (5)$$

where W is the matrix K with matrix elements $$K_{nm} = \sum_{p=1}^N \eta_p^i \eta_p^j \int_0^\tau dt_2 \int_0^{t_2} dt_1 \quad (6)$$

$$Q_m(t_1)Q_n(t_2)\sin[\omega_p(t_2 - t_1)]$$

projected onto the space satisfying the stability conditions, and $$S_{nm} = \vec{V}^{*T}_n W \vec{V}_m. \quad (7)$$

The power-optimal coefficients $\hat{B}_l$ that minimize the pulse-power requirement may then be computed by choosing the eigenvector of S with the largest-modulus eigenvalue.

In another embodiment of the fast-gate method (referred to as an "approximate protocol" hereinafter), the control parameters $A_n$ are chosen as a linear superposition of the set of eigenvectors of the matrix $\Gamma=M^TM$ that are smaller in absolute magnitude than a small threshold value Z>0, whereas Z=0 in the E-AMFM method. Thus, by adjusting the threshold value Z, additional eigenvectors of the matrix $\Gamma$ are allowed in an extended solution space to determine the control parameters $A_n$, in which the entangling operation caused by a pulse having the pulse function g(t) with the control parameters $A_n$ satisfies the gate operation conditions within a predetermined threshold value.

Examples of Pulse Shaping by E-AMFM Method and I-AMFM Fast-Gate Method

The E-AMFM method provides a laser pulse shaping to perform an exact XX gate operation with 100% fidelity computationally efficiently without the need for iterative computation or nonlinear approximations. Such power-optimal pulse shaping can be designed such that the gate-operation conditions and the active stabilization conditions are exactly fulfilled for a given gate duration τ. The optimized power requirement for power-optimized laser pulses is roughly inversely proportional to the gate duration τ.

Figure 4:
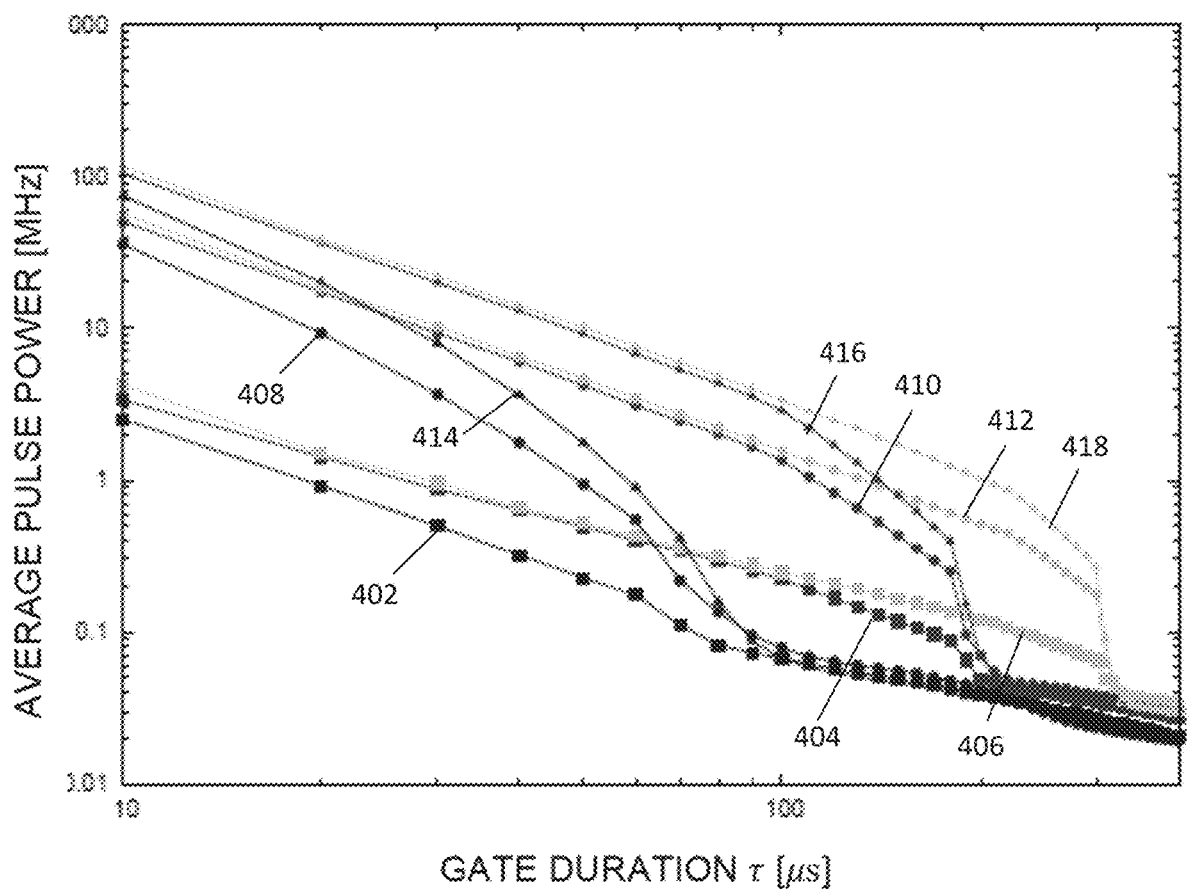
FIG. 4 illustrates power requirement of a power-optimized laser pulse shaped by an exact amplitude-and-frequency modulated (E-AMFM) method as a function of gate duration $\tau$ according to one embodiment.

FIG. 4 illustrates power requirement of an example power-optimized laser pulse shaped by the E-AMFM method. In this example, a chain 106 of trapped ions includes 15 trapped ions equally spaced with a distance of 5 μm apart. In FIG. 4, the vertical axis indicates the root-mean-square Rabi frequency in cycles per second $$\frac{1}{2\pi}\left[\frac{1}{\tau}\int_0^\tau \Omega(t)^2 dt\right]^{1/2}$$

(the average pulse power") of the power-optimized laser pulse, and the horizontal axis indicates the gate duration τ in microseconds (μs). Shown are cases of different pairs of ions in the chain of 15 trapped ions and with different degrees K of active stabilization with respect to motional-mode frequency drift $\Delta\omega_p$. Plots 402, 404, and 406 indicate averaged power of a power-optimized laser pulse provided by the E-AMFM method to execute an exact XX gate operation between two ions (referred to as a pair (1, 2)) at an end of the chain of 15 trapped ions (that are adjacent to each other), with no active stabilization, active stabilization of degree K=2, and active stabilization of degree K=4, respectively. Plots 408, 410, and 412 indicate averaged power of a power-optimized laser pulse provided by the E-AMFM method to execute an exact XX gate operation between the fourth and tenth ions (referred to as a pair (4, 10)) from the end of the chain of 15 trapped ions, with no active stabilization, active stabilization of degree K=2, and active stabilization of degree K=4, respectively. Plots 414, 416, and 418 indicate averaged power of a power-optimized laser pulse provided by the E-AMFM method to execute an exact XX gate operation between the first and eleventh ions (referred to as a pair (1, 11)) from the end of the chain of 15 trapped ions, with no active stabilization, active stabilization of degree K=2, and active stabilization of degree K=4, respectively. As can be seen, the averaged power of the power-optimized laser pulse drastically increases showing a steep cliff-like transition as the gate duration τ decreases. Such steep cliff-like transitions are observed at substantially the same values of the gate duration τ for the different pairs of ions and move toward higher values of the gate duration τ as the degree K of active stabilization increases. For example, plots 402, 408, 414 for pairs (1, 2), (4, 10), and (1, 11), respectively, with no active stabilization show steep cliff-like transitions at about 80 μs, plots 404, 410, 416 for pairs (1, 2), (4, 10), and (1, 11), respectively, with active stabilization of degree K=2 show steep cliff-like transitions at about 200 μs, and plots 406, 412, 418 for pairs (1, 2), (4, 10), and (1, 11), respectively, with active stabilization of degree K=4 show steep cliff-like transitions at about 300 μs. These trends are due to the fact that the number of gate operation conditions (which is equal to the number of ions in the chain, i.e., 15) remains the same for different pairs of ions, while the number of active stabilization conditions increases as the degree K of active stabilization increases. Therefore, it is expected that reducing the number of conditions that laser pulses must fulfill leads to lower power requirement of laser pulses. Furthermore, reduction in the required power by reducing the number of conditions that laser pulses must fulfill may be significant as can be seen from the difference between plots in FIG. 4 with different degrees K of active stabilization.

Figure 5A:
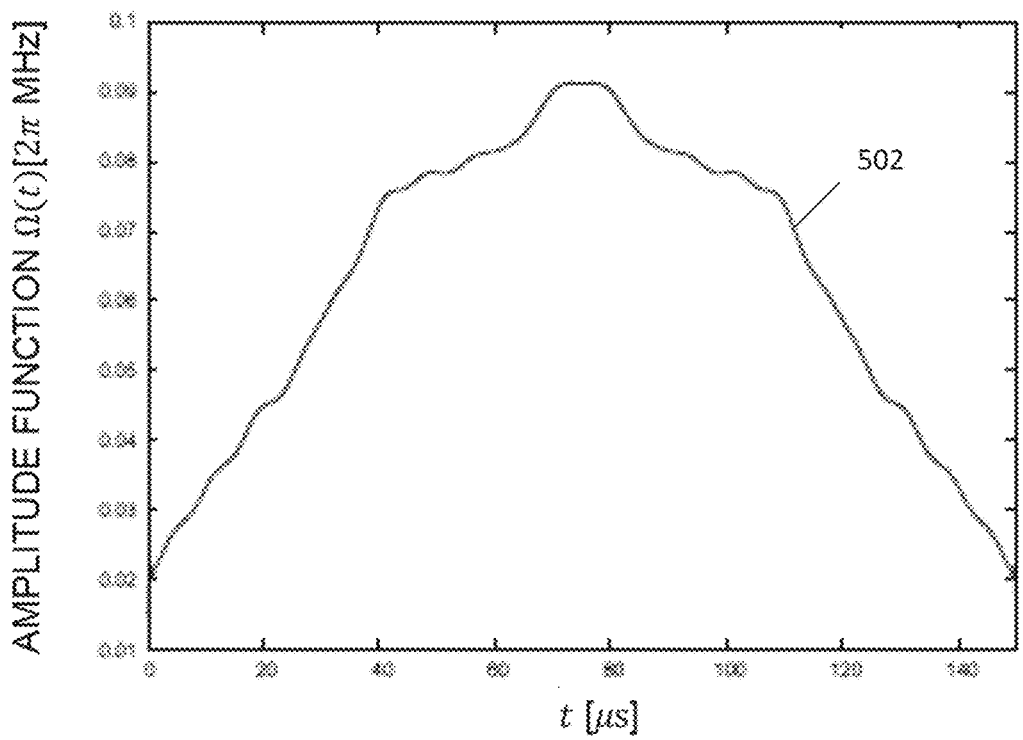
FIGS. 5A, 5B, 5C, 5D, and 5E illustrate properties of laser pulses for qubit pair (1, 11) according to one embodiment.
Figure 5B:
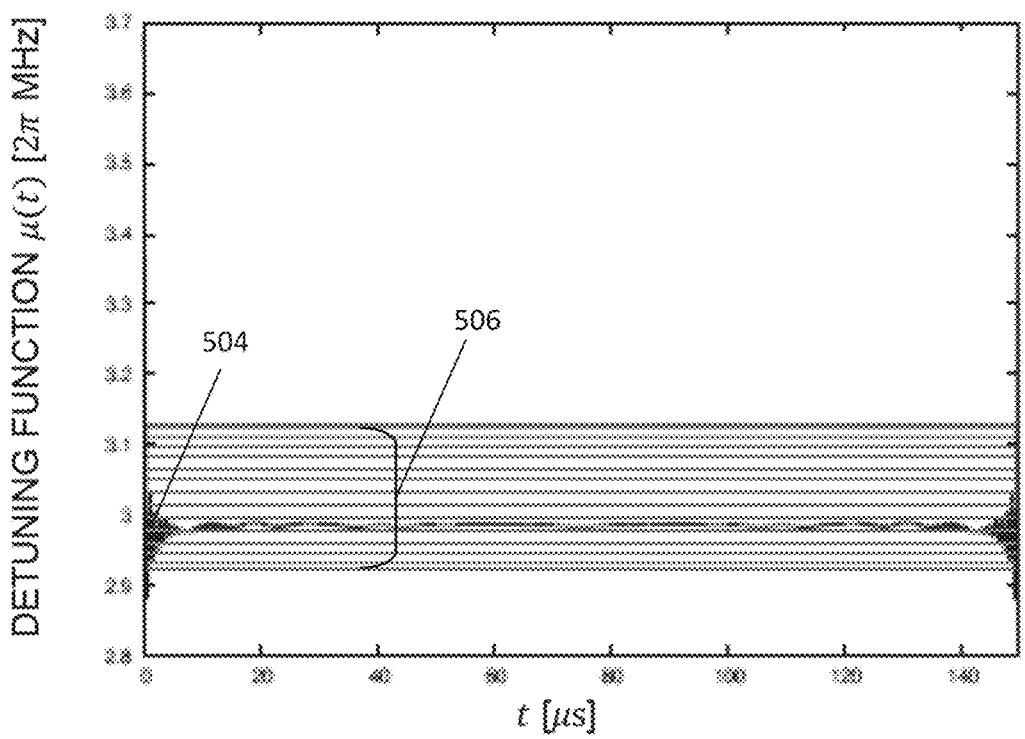
Figure 5C:
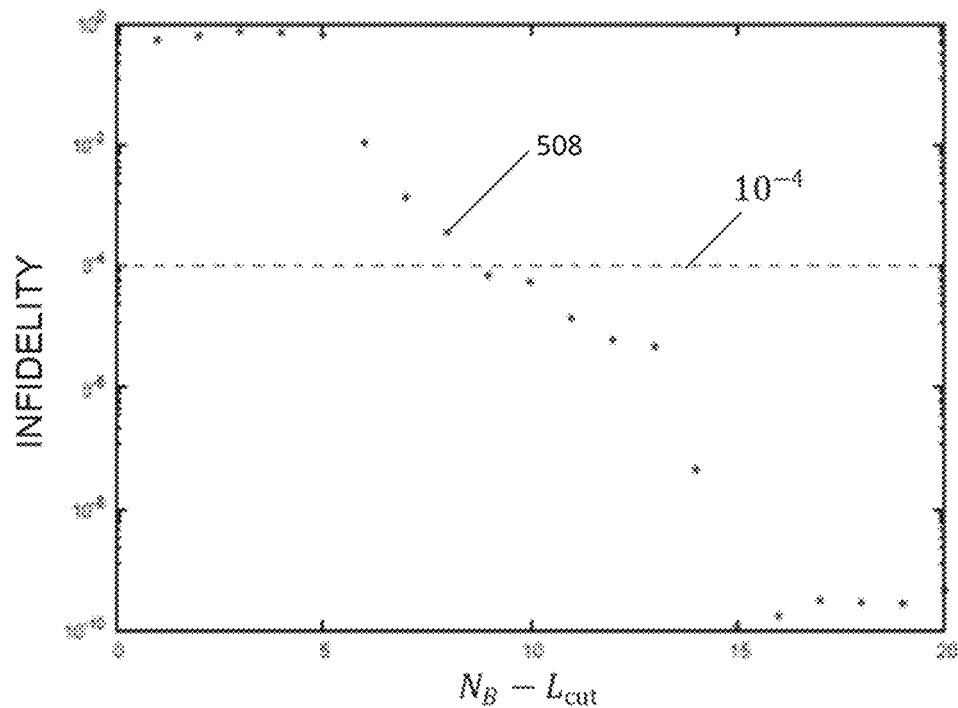

FIGS. 5A and 5B illustrate amplitude function $\Omega(t)$ 502 and detuning function $\mu(t)$ 504, respectively, of an example pulse computed by the fast-gate method according to the F-matrix protocol, for $N_B$ (the number of basis functions $Q_n(t)$)=323, $N_B-L_{cut}$=9, and the gate duration up to $\tau$=150 µs. The motional-mode frequencies $\omega_p$ 506 that are used for the entangling gate operation are also shown in FIG. 5B. The amplitude function $\Omega(t)$ and the detuning function µ(t) are obtained by decomposition of the pulse function g(t) according to $$g(t) = \Omega(t)\sin\left[\int_0^t \mu(t')dt'\right],$$

where the amplitude function $\Omega(t)$ [FIG. 5A] and the frequency function µ(t) [FIG. 5B] are determined exactly and uniquely. The amplitude function $2(t)$ 502 and the detuning function µ(t) 504 shown in FIGS. 5A and 5B are well-behaved and thus can be implemented with the capability of the hardware support modulations. FIG. 5C illustrates the infidelity 508 computed as a function of $N_B-L_{cut}$. As $L_{cut}$ decreases, the infidelity 508 rapidly decreases, below $10^{-4}$ with just $N_B-L_{cut} \geq 9$. This coincides with an acceptable amount of infidelity found in contemporary experiments performed today, roughly corresponding to the rate of spontaneous emission of the trapped ions. This shows that a large number of eigenvectors $\vec{V}_l$ of the matrix F may indeed be used to further minimize the power requirement with a marginal price in fidelity.

Figure 5D:
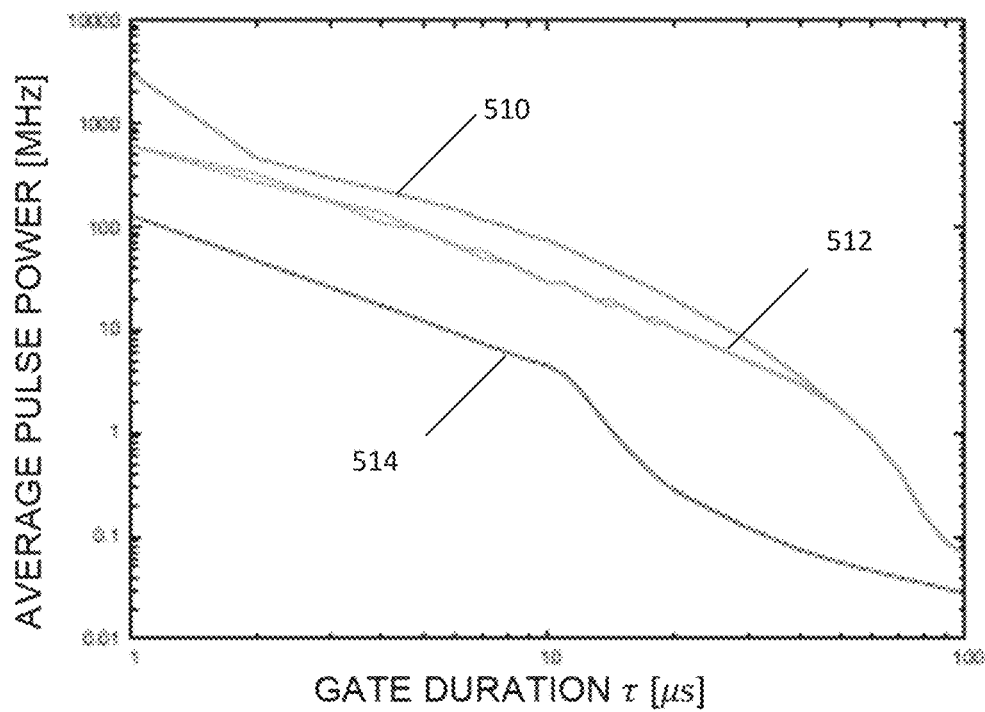

FIG. 5D illustrates power requirement of example power-optimized laser pulses 510, 512, and 514, shaped by the E-AMFM method, the I-AMFM fast-gate method according to the F-matrix protocol and the approximate protocol (i.e., 512 consists of two close-by curves, illustrating that the two I-AMFM protocols produce nearly identical results), and the lower bound of the power requirement, respectively, as a function of gate duration τ. It has been observed that the power requirement by the I-AMFM fast-gate method starts to provide power advantage for gate durations $\tau \leq 50$ µs and can result in a factor 5 saving in the power requirement at gate durations $\tau \approx 1$ µs for qubit pairs (1,11) in a 15-ion chain.

Figure 5E:
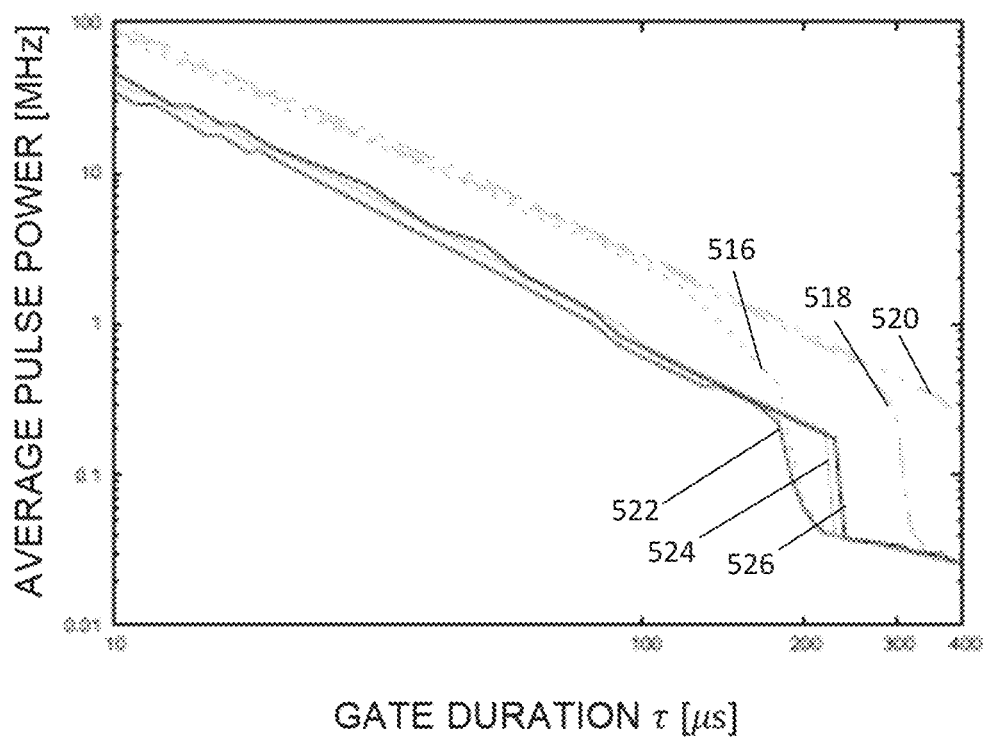

FIG. 5E illustrates power requirement of example power-optimized laser pulses 516, 518, 520, 522, 524, 526, shaped by the E-AMFM method with the stability degrees K=2, 4, 6, and the I-AMFM fast-gate method according to the approximate protocol with the stability degrees K=2, 4, 6, respectively, as a function of gate duration τ. It has been found that, at the stability degree K=6 and the gate duration τ=250 µs, the power saving can be as large as a factor of 15, exceeding an order of magnitude.

In embodiments described herein, pulse shaping methods are described that allow a small amount of infidelity in an entangling gate operation to be implemented by a shaped pulse, and in turn reduce the power requirement for implementing a resulting shaped pulse. The reduction in power requirement can be up to more than an order of magnitude under realistic, trapped-ion quantum computer operating conditions. By trading the power savings for gate duration, the two-qubit gates can be sped up by an order of magnitude for a given power budget. This trade-off comes with an additional benefit, i.e., a natural robustness of the gate with respect to experimental parameter drifts.

While the foregoing is directed to specific embodiments, other and further embodiments may be devised without departing from the basic scope thereof, and the scope thereof is determined by the claims that follow.

The invention claimed is:

1. A method for performing an entangling operation between trapped ions in a quantum computer, comprising:
    selecting, by a classical computer, a gate duration of a pulse to be applied to two trapped ions in a quantum processor, comprising a plurality of trapped ions, wherein each of the trapped ions has two frequency-separated states defining a qubit, and the pulse is generated by one or more lasers;
    selecting, by the classical computer, an amount of infidelity that is allowed in an entangling operation between the two trapped ions;
    computing, by the classical computer, a first set of values of an amplitude and a detuning frequency of the pulse based on the selected gate duration, the selected amount of infidelity, and a phase-space condition for states of the plurality of trapped ions to remain unchanged at the end of the gate duration;
    selecting, by the classical computer, a second set of values of the amplitude and the detuning frequency of the pulse among the first set of values based on a gate angle condition for entangling interaction between the two trapped ions to be a selected value;
    generating, by the classical computer, the pulse based on the second set of values of the amplitude and the detuning frequency of the pulse;
    applying, by use of a system controller and the one or more lasers, the generated pulse to each of the two trapped ions to perform the entangling operation between the two trapped ions;
    measuring, by use of the system controller, a population of qubit states in the quantum processor; and
    outputting, by the classical computer, the measured population of qubit states.

2. The method of claim 1, wherein the computing of the first set of values of the amplitude and the detuning frequency of the pulse comprises decomposing a pulse function is decomposed of the pulse using basis functions, and computing coefficients of the basis functions.

3. The method of claim 2, wherein the computing of the coefficients of the basis functions comprises:
    selecting the coefficients of the basis functions such that infidelity of the entangling operation caused by a pulse having the pulse function equals the selected amount of infidelity.

4. The method of claim 2, wherein the computing of the coefficients of the basis functions comprises:
    selecting the coefficients of the basis functions from an extended solution space, in which the entangling operation caused by a pulse having the pulse function satisfies the phase-space condition and the gate angle condition within a predetermined threshold value.

5. The method of claim 1, wherein the computing of the first set of values of the amplitude and the detuning frequency of the pulse is further based on stabilization conditions.

6. The method of claim 1, wherein the computing of the first set of values of the amplitude and the detuning frequency of the pulse is further based on a power optimization condition.

7. An ion trap quantum computing system, comprising:
    a quantum processor comprising a plurality of trapped ions, each trapped ion having two hyperfine states defining a qubit;
    one or more lasers configured to emit a laser beam, which is provided to trapped ions in the quantum processor;
    a classical computer configured to perform operations comprising:

selecting a gate duration of a pulse to be applied to two trapped ions in the quantum processor;

selecting an amount of infidelity that is allowed in an entangling operation between the two trapped ions;

computing a first set of values of an amplitude and a detuning frequency of the pulse based on the selected gate duration, the selected amount of infidelity, and a phase-space condition for states of the plurality of trapped ions to remain unchanged at the end of the gate duration;

selecting a second set of values of the amplitude and the detuning frequency of the pulse among the first set of values based on a gate angle condition for entangling interaction between the two trapped ions to be a selected value; and generating the pulse based on the second set of values of the amplitude and the detuning frequency of the pulse; and a system controller configured to execute a control program to control the one or more lasers to perform operations on the quantum processor, the operations comprising:

applying the generated pulse to each of the two trapped ions to perform the entangling operation between the two trapped ions; and measuring population of qubit states in the quantum processor, wherein the classical computer is further configured to output the measured population of qubit states in the quantum processor.

8. The ion trap quantum computing system of claim 7, wherein the computing of the first set of values of the amplitude and the detuning frequency of the pulse comprises decomposing a pulse function of the pulse using basis functions, and computing coefficients of the basis functions.

9. The ion trap quantum computing system of claim 8, wherein the computing of the coefficients of the basis functions comprises:

selecting the coefficients of the basis functions such that infidelity of the entangling operation caused by a pulse having the pulse function equals the selected amount of infidelity.

10. The ion trap quantum computing system of claim 8, wherein the computing of the coefficients of the basis functions comprises:

selecting the coefficients of the basis functions from an extended solution space, in which the entangling operation caused by a pulse having the pulse function satisfies the phase-space condition and the gate angle condition within a predetermined threshold value.

11. The ion trap quantum computing system of claim 7, wherein the computing of the first set of values of the amplitude and the detuning frequency of the pulse is further based on stabilization conditions.

12. The ion trap quantum computing system of claim 7, wherein the computing of the first set of values of the amplitude and the detuning frequency of the pulse is further based on a power optimization condition.

13. An ion trap quantum computing system, comprising:
a classical computer;
a quantum processor comprising a plurality of trapped ions, each trapped ion having two hyperfine states defining a qubit;

a system controller configured to execute a control program to control one or more lasers to perform operations on the quantum processor; and non-volatile memory having a number of instructions stored therein which, when executed by one or more processors, causes the ion trap quantum computing system to perform operations comprising:

selecting, by the classical computer, a gate duration of a pulse to be applied to two trapped ions in the quantum processor;

selecting, by the classical computer, an amount of infidelity that is allowed in an entangling operation between the two trapped ions;

computing, by the classical computer, a first set of values of an amplitude and a detuning frequency of the pulse to be applied to each of the two trapped ions based on the selected gate duration, the selected amount of infidelity, and a phase-space condition for states of the plurality of trapped ions to remain unchanged at the end of the gate duration;

selecting, by the classical computer, a second set of values of the amplitude and the detuning frequency of the pulse among the first set of values based on a gate angle condition for entangling interaction between the two trapped ions to be a selected value;

generating, by the classical computer, the pulse based on the second set of values of the amplitude and the detuning frequency of the pulse;

applying, by the system controller, the generated pulse to each of the two trapped ions to perform the entangling operation between the two trapped ions;

measuring, by the system controller, population of qubit states in the quantum processor; and outputting, by the classical computer, the measured population of qubit states in the quantum processor.

14. The ion trap quantum computing system of claim 13, wherein the computing of the first set of values of the amplitude and the detuning frequency of the pulse comprises decomposing a pulse function of the pulse using basis functions, and selecting coefficients of the basis functions such that infidelity of the entangling operation caused by a pulse having the pulse function equals the selected amount of infidelity.

15. The ion trap quantum computing system of claim 13, wherein computing the first set of values of the amplitude and the detuning frequency of the pulse comprises decomposing a pulse function of the pulse using basis functions, the computing of the pulse function comprises:

selecting coefficients of the basis functions from an extended solution space, in which the entangling operation caused by a pulse having the pulse function satisfies the phase-space condition and the gate angle condition within a predetermined threshold value.

16. The ion trap quantum computing system of claim 13, wherein the computing of the first set of values of the amplitude and the detuning frequency of the pulse is further based on stabilization conditions.

17. The ion trap quantum computing system of claim 13, wherein the computing of the first set of values of the amplitude and the detuning frequency of the pulse is further based on a power optimization condition.

* * * * *